United States Patent
Dougherty et al.

(10) Patent No.: US 7,707,461 B2
(45) Date of Patent: Apr. 27, 2010

(54) DIGITAL MEDIA DRIVE FAILURE PREDICTION SYSTEM AND METHOD

(75) Inventors: Michael J. Dougherty, Houston, TX (US); Chandrakant Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 11/700,482

(22) Filed: Jan. 31, 2007

(65) Prior Publication Data
US 2008/0180084 A1    Jul. 31, 2008

(51) Int. Cl.
G06F 11/00    (2006.01)
(52) U.S. Cl. ........................................ 714/47
(58) Field of Classification Search ............... 714/47, 714/43
See application file for complete search history.

(56) References Cited

U.S. PATENT DOCUMENTS

| | | | |
|---|---|---|---|
| 5,557,183 A * | 9/1996 | Bates et al. | 318/434 |
| 5,889,784 A | 3/1999 | Rogers | |
| 6,249,887 B1 | 6/2001 | Gray et al. | |
| 6,359,433 B1 * | 3/2002 | Gillis et al. | 324/210 |
| 6,489,738 B1 * | 12/2002 | Bates et al. | 318/434 |
| 6,574,754 B1 * | 6/2003 | Smith | 714/47 |
| 6,982,842 B2 * | 1/2006 | Jing et al. | 360/31 |
| 7,050,936 B2 | 5/2006 | Levy et al. | |
| 2004/0051988 A1 | 3/2004 | Jing et al. | |
| 2008/0077340 A1 * | 3/2008 | Nguyen | 702/64 |

OTHER PUBLICATIONS

"About S.M.A.R.T. Technology", http://www.hddlife.com/eng/smart.html, pp. 1-3.
PalickSoft Website—Control all your hard drives from one place, http://www.siguardian.com, pp. 1-2.
BenchmarkHQ, http://www.benchmarkhq.ru/english.html?/mon_e.html, 1 page.
International Search Report Dated May 26, 2008.

* cited by examiner

*Primary Examiner*—Bryce P Bonzo

(57) ABSTRACT

A digital media drive failure prediction system comprises a prediction module configured to analyze a current draw associated with a digital media drive measured at least two different operating times of the digital media drive to automatically determine whether a different between the measured current draws indicates an impending failure of the digital media drive.

19 Claims, 4 Drawing Sheets

DIGITAL MEDIA DRIVE FAILURE PREDICTION SYSTEM AND METHOD

BACKGROUND OF THE INVENTION

The sudden failure of a digital media drive (DMD), such as a hard disk drive (HDD), presents a significant inconvenience. For example, sudden power interruptions, contaminants, over-heating, spindle motor failure, etc., can cause failure of the DMD, resulting in an unexpected loss of data, corruption of data and/or inoperability of the DMD.

BRIEF DESCRIPTION OF THE DRAWINGS

For a more complete understanding of the present invention, the objects and advantages thereof, reference is now made to the following descriptions taken in conjunction with the accompanying drawings, in which.

DETAILED DESCRIPTION OF THE DRAWINGS

Figure 1:
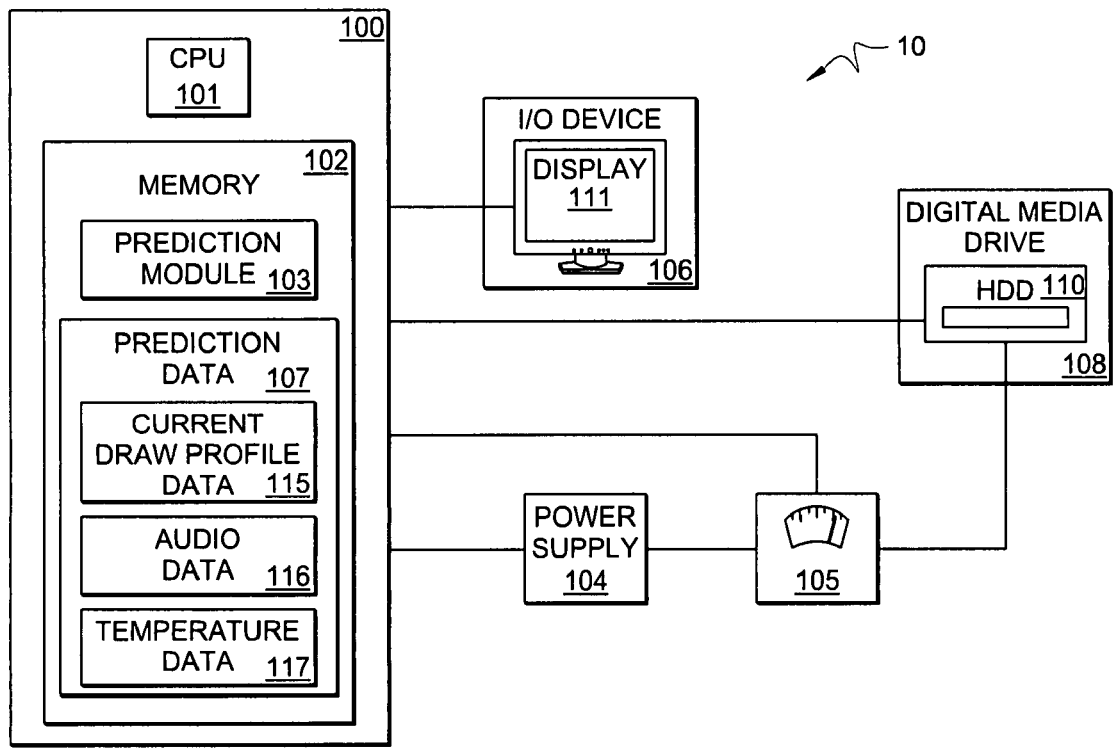
FIG. 1 is a block diagram illustrating an embodiment of a digital media drive failure prediction system.

FIG. 1 is a block diagram illustrating an embodiment of a digital media drive (DMD) failure prediction system 10. In the embodiment illustrated in FIG. 1, prediction system 10 comprises a computer 100, a power supply 104 for powering computer 100, a meter system 105, an input/output (I/O) device 106 and a digital media drive (DMD) 108. In FIG. 1, DMD 108 comprises a hard disk drive (HDD) 110; however, it should be understood that DMD 108 may comprise other types of drive devices. Further, HDD 110 may be an internal HDD, an external HDD, or an HDD within a bank of multiple HDDs. Computer 100 may comprise a desktop computer, notebook computer, a server, a game machine, a music device, a personal data assistant (PDA), a video device or a network machine. Although only a single HDD 110 is shown in FIG. 1, prediction system 10 may be used to predict an impending failure for a greater number of HDDs 110. HDD 110 is shown in more detail in FIG. 2. Prediction system 10 enables the prediction of an impending failure of HDD 110. For example, in some embodiments, system 10 enables the prediction of an impending failure of HDD 110 by using measurements of the electrical power supplied by power supply 104 to HDD 110.

In FIG. 1, I/O device 106 comprises a display 111; however, it should be understood that I/O device 106 may comprise other types of devices for inputting information to or receiving information from computer 100. In the embodiment illustrated in FIG. 1, computer 100 comprises a central processing unit (CPU) 101 and a memory 102. CPU 101 processes instructions and data for predicting the failure of HDD 110 and for taking responsive measures upon such a prediction, such as warning a user through I/O device 106. Memory 102 may comprise volatile memory, non-volatile memory, and/or permanent storage. Memory 102 is coupled to CPU 101 and stores a prediction module 103 which comprises instructions and data used for predicting the failure of HDD 110 and responding to such a prediction failure criteria. Prediction module 103 may comprise hardware, software, firmware, or a combination thereof. In FIG. 1, prediction module 103 is illustrated as being stored in memory 102 so as to be accessible and executable by CPU 101. However, it should be understood that prediction module 103 may be otherwise stored and/or located. In the embodiment illustrated in FIG. 1, memory 102 also comprises prediction data 107 used by prediction module 103 to predict an impending failure of HDD 110.

In FIG. 1, prediction data 107 comprises current draw profile data 115 reflecting measurements of the current draw profile of HDD 110, audio data 116 reflecting audio or sound profile measurements associated with the operation of HDD 110, and temperature data 117 reflecting temperature profile measurements associated with the operation of HDD 110. However, it should be understood that other data may be collected and used for predicting an impending failure of HDD 110. It should be further understood that, in some embodiments, module 103 is modifiable. For example, a user may provide feedback to module 103 regarding the accuracy of a failure prediction or a missed prediction, either from an HDD coupled to system 10 or an HDD coupled to a different system. In some embodiments, module 103 may have a machine learning capability, such as a genetic algorithm, that correlates measurement data with failures and thus enables enhancement of prediction reliability when additional data becomes available. However, other forms of machine learning may also be used.

In the embodiment illustrated in FIG. 1, meter system 105 is electrically disposed between power supply 104 and HDD 110 to facilitate measuring the electrical power used by HDD 110. For example, meter system 105 measures the current draw by HDD 110 and reports current draw values to module 103, where the values are stored as prediction data 107 (e.g., current draw profile data 115) and used by module 103 for predicting the failure of HDD 110. If multiple HDDs 20 are used with system 10, multiple meter systems 105 may be used (e.g., one meter system 105 being used for each HDD 110). In some embodiments, meter system 105 also comprises sound and temperature measurement capabilities for measuring sound and temperature external to HDD 110 for obtaining and/or otherwise collecting audio data 116 and/or temperature data 117. However it should be understood that current, sound and temperature measurements may be made using measurement devices that are not included in meter system 105, but are nevertheless available for use by module 103.

Figure 2:
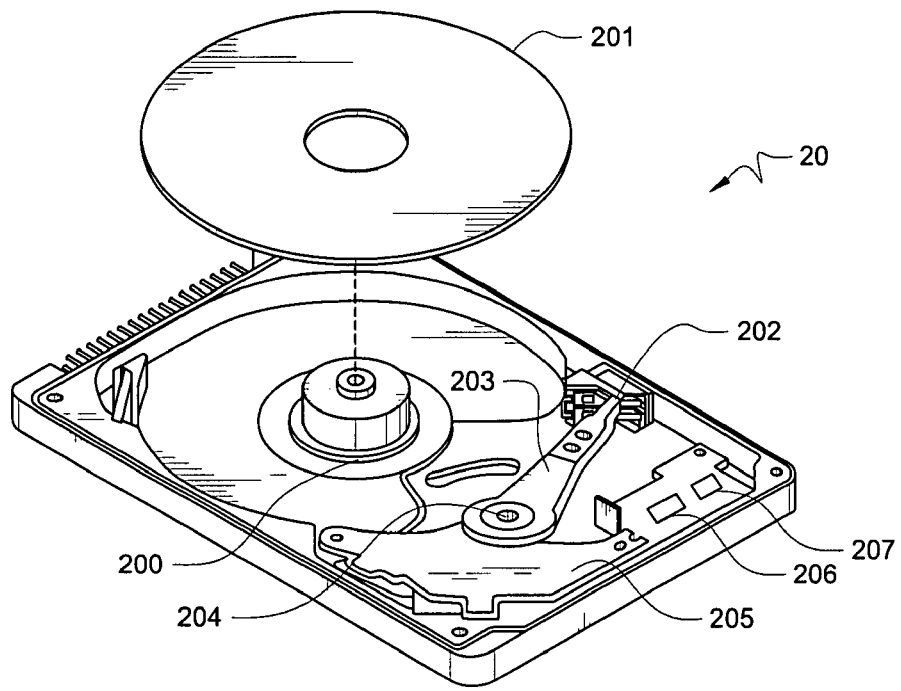
FIG. 2 is an illustration of an embodiment of a hard disk drive to which embodiments of the digital media drive failure prediction system may be employed to advantage.

FIG. 2 is a diagram illustrating an exemplary embodiment of HDD 110. HDD 110 comprises a spindle motor 200, a disk 201, a head 202, an arm 203, a stepper motor 204, an electronics package 205, a sound transducer 206 and a thermocouple 207. Spindle motor 200 spins disk 201 at a design-specified rate necessary for head 202 to read data from or write data to disk 201. Head 202 is situated at an end of arm 203 and is positioned at various radial locations on disk 201 by stepper motor 204 which rotates arm 203. Electronics package 205 controls the operation of spindle motor 200 and stepper motor 204 so that head 202 can write data to or read data from a particular location on disk 201. Electronics package 205 also interfaces with computer 100 or any other external devices connected to HDD 110.

Generally, spindle motor 200 is provided with a lubricant and, early in its life, uses a relatively minimal amount of electrical power to spin disk 201 at the specified rate. However, as spindle motor 200 ages, the lubricant wears out and materials in motor 200 begin to oxidize. As a result, internal friction in motor 200 increases, thereby increasing the electrical power required to spin disk 201. The excess electrical power (e.g., the amount above that consumed by HDD 110 when HDD 110 was new), results in increased noise and heat generated by HDD 110. Another effect of wear and aging of HDD 110 is the presence of physical imperfections in disk 201. Ideally, disk 201 is perfectly smooth, flat and clean, enabling head 202 to ride on a cushion of air just above the surface of disk 201. Contaminant particles adhering to the surface of disk 201, along with warping of disk 201, result in another source of friction when head 202 contacts the particles or scrapes a portion of the surface of disk 201, thereby resulting in increased noise and heat. In some embodiments, this noise and heat is sensed by sound transducer 206 and thermocouple 207. However, it should be understood that meter system 105 (FIG. 1) may also be used, alternatively or additionally, to detect the heat and noise associated with HDD 110.

Thus, excess power consumption by spindle motor 200 indicates mechanical inefficiencies in spinning disk 201 relative to head 202. Embodiments of system 10 monitor the power consumed by spindle motor 200 at different times to predict an impending failure of HDD 110. For example, HDD 110 generally has three primary sinks for power consumption, although other HDDs may have more. Spindle motor 200 draws electrical power while disk 201 is spinning, although it typically draws more power to bring disk 201 from a rest up to the specified spin rate than it draws in order to maintain the spin rate. Stepper motor 204 also draws electrical power to move arm 203. Stepper motor 204 draws current in intermittent bursts since arm 203 has a series of discrete radial locations from which it reads from or writes to disk 201. Stepper motor 204 also draws increased current due to lubricant and material degradation with age and use. Electronics package 205 also draws current, although its current draw should remain fairly consistent over the lifetime of HDD 110.

In some embodiments, electronics package 205 is configured to measure and report the sound level sensed by sound transducer 206 and the temperature sensed by thermocouple 207 to prediction module 103. In some embodiments, electronics package 205 is configured to measure and report the current draw of motors 200 and 204 and itself, either separately or together. These measurements may be in place of or in addition to measurements made by meter system 105. Thus, in some embodiments, prediction module 103 uses measurements from meter system 105 and electronics package 205, including current measurements, sound measurements and temperature measurements to predict an impending failure of HDD 110.

Figure 3:
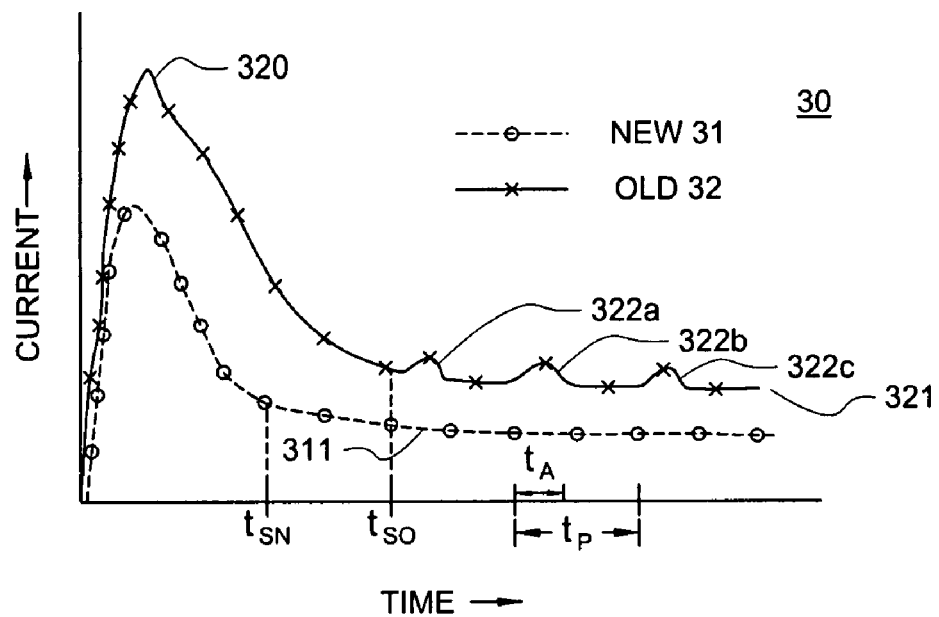
FIG. 3 is a diagram illustrating a comparison of current draw profiles between a new spindle motor and an old spindle motor.

FIG. 3 is a diagram illustrating a plot 30 of two current draw profiles 31 and 32 (which may be representative of information stored as current draw profile data 115). Current draw profile 31 shows the current draw of a new spindle motor with respect to time, whereas current draw profile 32 shows the current draw of an older spindle motor. As used herein, "new" and "old" refers generally to the operating hours, such that an "older" spindle motor has a greater number of operating hours than a "new" spindle motor. Both profiles 31 and 32 show the current draw when a spindle motor begins spinning up, and then after each reaches the specified spin rate and maintaining that rate. Profile 31 shows a rapid increase in current draw as the new spindle motor initially turns on, reaches a current draw peak 310, and then tapers off to a current draw steady state 311 when the motor reaches the specified spin rate. Old motor profile 32 also shows a rapid increase in current draw, up to peak 320, with the current draw eventually reaching a steady state 321.

Current draw peak 320 is higher than current draw peak 310, thereby illustrating the increased power required to reach the desired spin rate for an older spindle motor. Steady state 321 is reached by the older spindle motor at $t_{SO}$, which is later than the new spindle motor reaches steady state 311 at $t_{SN}$. Further, when steady state 321 is reached, it is at a higher level than steady state 311, thereby reflecting the increased friction of an older disk drive.

Old spindle motor profile 32 also manifests short-duration anomalies 322a-c. Specifically, short-duration anomalies 322a-c are spikes or bumps in current draw profile 32 that are shorter than the spin period, $t_P$, of the motor at the specified steady state spin rate. As shown in FIG. 3, short-duration anomalies 322a-c are each of duration $t_A$ where $t_A<t_P$. Short-duration anomalies 322a-c reflect momentary surges in power draw caused by friction events that are shorter than the spin period of the motor. For example, a worn spot or blemished portion of a rotating shaft could cause increased friction when it contacts a bearing. Other explanations include HDD head 202 striking a contaminant particle or scraping a portion of disk 201.

Figure 4:
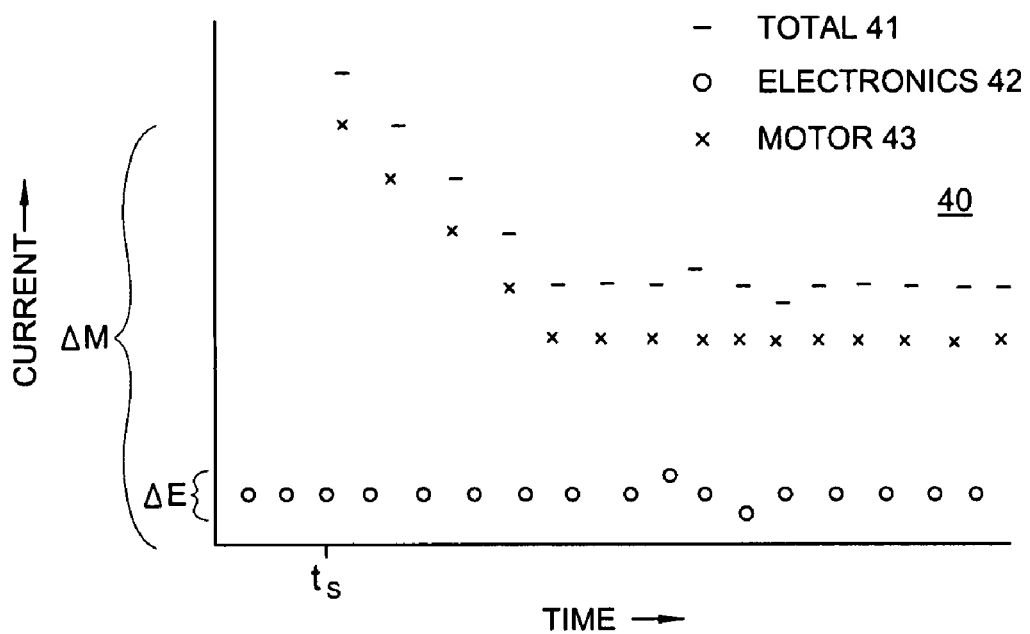
FIG. 4 is a diagram illustrating the components of a current draw profile.

In some embodiments, since the current draw profiles are measured with digital equipment, the profiles are not smooth curves but are rather sequences of measurement values or calculated values. FIG. 4 is a diagram illustrating a plot 40 of the total current draw profile 41 for DMD 108 (e.g., HDD 110), which includes a current draw profile 42 for an electronics package (e.g., electronics package 205) and a current draw profile 43 for a spindle motor (e.g., spindle motor 200) (which may be representative of information stored as current draw profile data 115). To illustrate that the current draw profiles comprise sequences of values, profiles 41-43 are vectors, shown as a series of discrete points. As can be seen in FIG. 4, adding the current draw profile 42 for an electronics package to the current draw profile 43 for a spindle motor provides the total current draw profile 41. For simplicity of illustration and description, a stepper motor is assumed to not be operating during the time period shown in FIG. 4.

Therefore, if $I_{T1}$ represents the total current draw, $I_{A1}$ represents the current draw of the electronics package, and $I_{M1}$ represents the motor draw for a first measurement data set, then:

$$I_{T1}=I_{A1}+I_{M1}$$

where $I_{T1}$, $I_{A1}$ and $I_{M1}$ represent the instantaneous values of profiles 41-43, respectively. $\Delta_E$ is the variance in the current draw of the electronics package, whereas $\Delta_M$ is the variance in the current draw of the spindle motor. As illustrated in plot 40, $\Delta_M$ is significantly larger than $\Delta_E$. Further, since an electronics package typically comprises solid state devices, which age more gracefully than electromechanical devices such as motors, the current draw of an electronics package should not change significantly over time, as compared with a spindle motor.

The significance of $\Delta_M$ being significantly larger than $\Delta_E$ is that changes in the current draw of the spindle motor may be estimated using changes in the total current draw of an HDD.

Thus, a second current measurement set taken or obtained at a later time than the first measurement set, represented by:

$$I_{T2}=I_{A2}+I_{M2}$$

can be used to determine a difference in total current draw, thereby enabling estimation of the difference in spindle motor current draw between the two measurement sets:

$$I_{T2}-I_{T1}=I_{A2}+I_{M2}-I_{M1}\approx I_{M2}-I_{M1}$$

This is because:

$$I_{A1}\approx I_{A2}$$

Referring again to FIG. 1, during the lifetime of HDD 110, prediction module 103 records and/or otherwise evaluates a series of current draw profiles 115 measured at different times, each comprising a sequence of values, and produces a set of differences between the current draw profiles, each comprising a sequence of difference values. The sequence of difference values is a difference vector. In general, a difference vector may be defined as:

$$D_{J,K}=I_{TJ}-I_{TK}\approx I_{MJ}-I_{MK}$$

where J and K represent the $J^{th}$ and $K^{th}$ measured current profiles, and each current profile represents a sequence of measured values. In some embodiments, HDD 110 is configured so that electronics package 205 reports the current draw measurement of spindle motor 200 separately than the current draw measurement of HDD 110 as a whole unit. In this embodiment, the difference vectors may be substantially exact.

It is important to note that J and K do not need to be sequential numbers. For example, a difference vector may be formed between immediately subsequent measured profiles, but may also be formed using a pair of profiles that has multiple intervening measurement sets. Further, a difference vector may not be limited to using individually measured profiles, but also may be between averages of groups of profiles, or between a single profile and an average. Average profiles may range from moving window averages, in which only a predefined number of the most recent profiles are used, up through a cumulative historic average, in which substantially all measured profiles are used.

Figure 5:
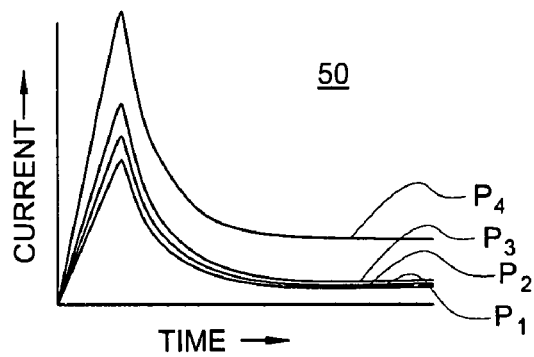
FIG. 5 is a diagram illustrating a comparison of current draw profiles as a spindle motor ages.
Figure 6:
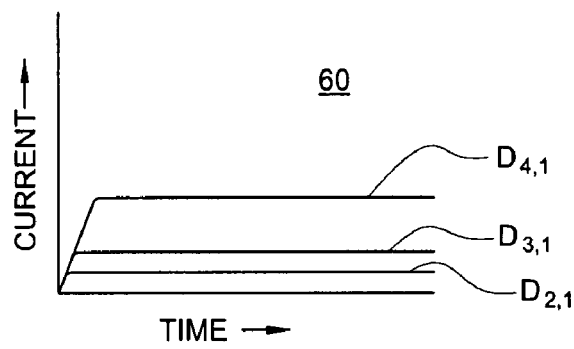
FIG. 6 is a diagram illustrating a comparison of current draw profile differences as a spindle motor ages.

The difference vectors are analyzed by prediction module 103 using a number of different criteria. For example, a difference vector may be compared with a pre-determined difference threshold and/or a pre-determined ratio threshold, where exceeding a threshold indicates impending failure. If the difference vector is calculated using a recent profile and a profile measured when HDD 110 was new, the difference vector represents a total change in the current draw of spindle motor 200. FIG. 5 illustrates a plot 50 of four current draw profiles, $P_1$-$P_4$, where $P_1$ is the earliest measured profile, followed by $P_2$, followed by $P_3$, and followed by $P_4$, which is the most recent profile (where the current draw profiles $P_1$-$P_4$ may be representative of information stored as current draw profile data 115). FIG. 6 shows a plot 60 of difference vectors $D_{2,1}$, $D_{3,1}$ and $D_{4,1}$ which represent difference vectors calculated between each of profiles $P_2$-$P_4$ and baseline profile $P_1$. Difference vector curves $D_{2,1}$, $D_{3,1}$ and $D_{4,1}$ are compared with a threshold to determine the amount of degradation of spindle motor 200.

Figure 7:
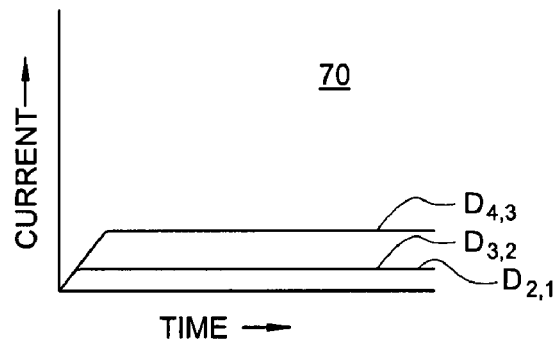
FIG. 7 is another diagram illustrating a comparison of current draw profile differences as a spindle motor ages.

If a difference vector is calculated using two subsequently measured profiles, however, that difference vector can be used to indicate a rate of change in the current draw, thereby indicating an acceleration in degradation. FIG. 7 shows a plot 70 of difference vectors $D_{2,1}$, $D_{3,1}$ and $D_{4,1}$, which represent difference vector calculated using two immediately subsequent profiles. As indicated by FIG. 5, HDD 110 degrades at a constant rate from profile $P_1$ through profile $P_3$, then experiences a sudden accelerated degradation for profile $P_4$. This accelerated degradation is notable by difference vector $D_{4,3}$ exceeding both $D_{3,2}$ and $D_{2,1}$.

In some embodiments, protection module 103 is programmed to use a change in the rate of degradation to predict an impending failure of HDD 110. In this embodiment, $D_{4,3}$ is compared with a previously determined difference vector, such as $D_{2,1}$. In fact, $D_{2,1}$ may actually be calculated at the same time as $D_{4,3}$, but it is defined herein as a previously determined difference vector because $D_{2,1}$ could have been calculated prior to the data being available for calculating $D_{4,3}$. Another analysis method is to integrate the differences. For example, since the difference vectors comprise a sequence of difference values, the integration process may comprise summing all the values. In some embodiments, integration may involve more calculation (e.g., if a sequence of values was not measured at equal intervals).

In some embodiments, prediction module 103 analyzes difference vectors to search for the presence of presence of short-duration anomalies, such as anomalies 322a-c shown in FIG. 3. In some embodiments, to enable identification of the presence of short-duration anomalies, meter system 105 or electronics package 205 samples the current draw and provides measurement data to prediction module 103 at a faster rate than the spin rate of spindle motor 100. If anomalies 322a-c arose or worsened at some point after a current draw profile was measured, then a later-determined difference vector will contain evidence of anomalies 322a-c. In some embodiments, prediction module 103 detects short-duration anomalies based on the frequency spectrum of a difference vector or a current draw profile. Typical methods for determining a frequency spectrum include a Fast Fourier Transform (FFT) and a Discrete Fourier Transform (DFT).

Figure 8:
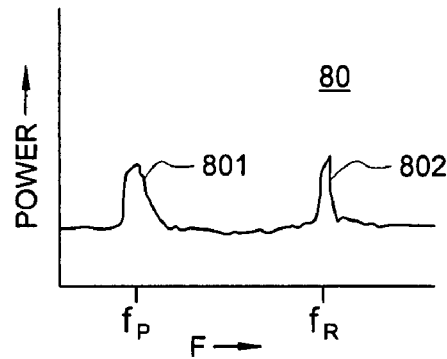
FIG. 8 is a diagram illustrating a frequency spectrum of current draw anomalies.

FIG. 8 illustrates a plot 80 of a frequency spectrum of current draw anomalies 322a-c from FIG. 3. Plot 80 shows a power spike 801 at a first frequency, $f_P$, and a second power spike 802 at a second frequency, $f_R$. The power spike 801 at $f_P$ results from conversion of externally-supplied alternating current (AC) power to direct current (DC) (e.g., if external AC power is used to operate computer 100). Even if spindle motor 200 is powered by DC, some residue of the AC power frequency will likely be apparent in plot 80. However it should be understood that spindle motor 200 may be powered by AC. In the United States, $f_P$ is 60 HZ, while $f_P$ is 50 HZ in Europe and many other parts of the world. Power spike 802 at $f_R$, which is an integer multiple of the spin rate of spindle motor 200, indicates current draw anomalies occurring at a rate equal to one or more times the spin rate of spindle motor 200. In some embodiments, prediction module 103 is configured to analyze the power of the frequency spectrum at $f_R$ to determine and/or otherwise identify the existence of short-duration anomalies 322a-c. For example, in some embodiments, module 103 power spike 802 at $f_R$ is detected and correlated with an integer multiple of the spin rate of spindle motor 200. Short-duration anomalies 322a-c are often associated with mechanical problems occurring once or more per rotation period of spindle motor 200. Thus, in some embodiments, prediction module 103 is used to identify the presence and/or worsening of mechanical problems to predict an impending failure of HDD 110.

In some embodiments, in addition to analyzing current draw profiles, difference vectors and frequency spectrums, prediction module 103 is also configured to record and/or otherwise analyze sound and temperature measurements from sound transducer 206, thermocouple 207 and/or meter system 105. Thus, in some embodiments, prediction module 103 analyzes current draw changes, the presence of short-duration anomalies, excessive heat generation, and/or excessive noise to predict an impending failure of HDD 110.

Figure 9:
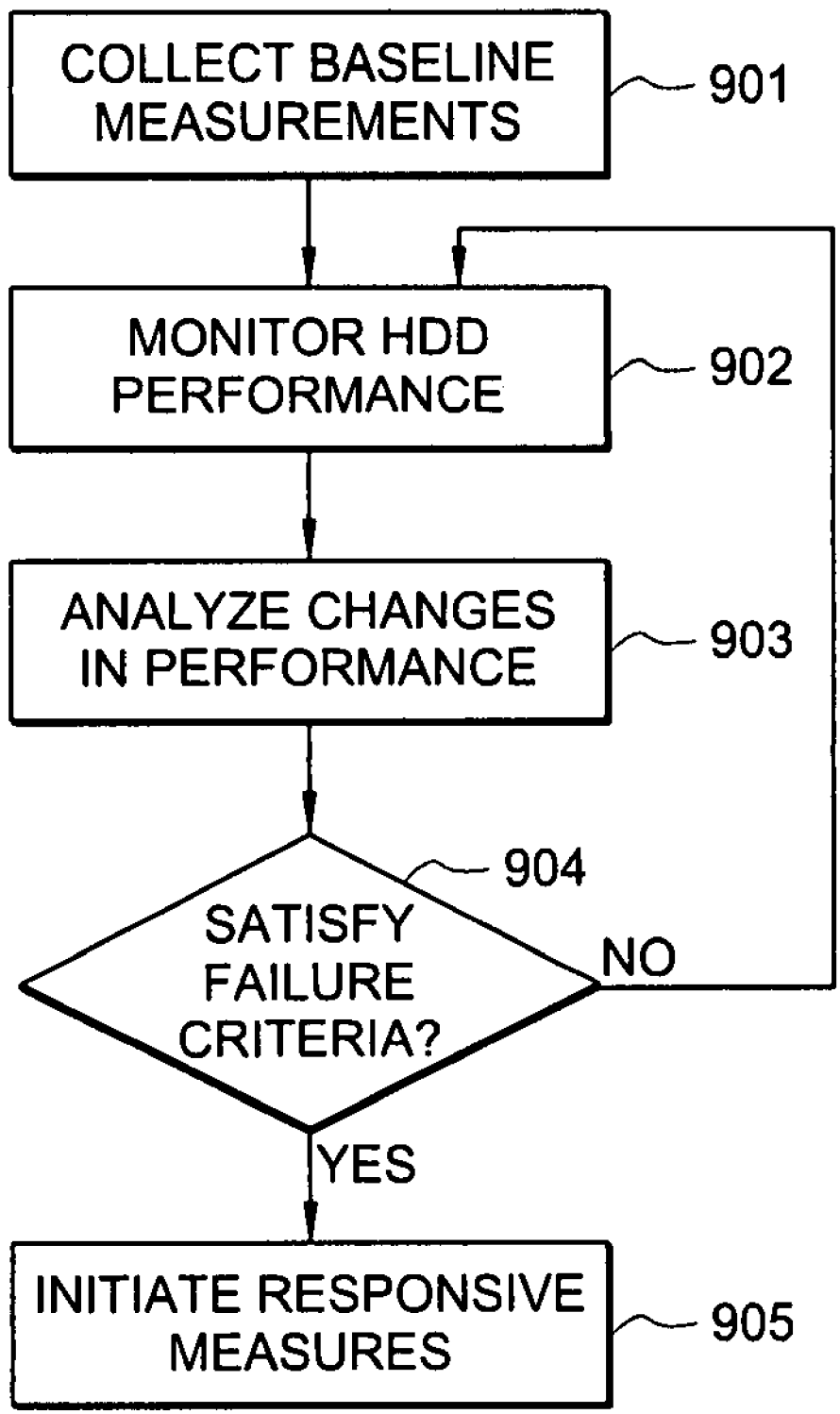
FIG. 9 is a flow diagram illustrating an embodiment of a digital media drive failure prediction method.

FIG. 9 illustrates an embodiment of a digital media drive failure prediction method 90. The method 90 begins with collecting baseline measurements of current draw associated with HDD 110 at block 901. Baseline measurements may be collected by meter system 105 and/or electronics package 205 when HDD 110 is first installed or coupled to computer 100 or if prediction module 103 is newly installed in an older computer 100 where HDD 110 already resides or is coupled thereto. Prediction module 103 stores the baseline prediction data 107 in memory 102. At block 902, prediction module 103 monitors the performance of HDD 110 over time using meter system 105 and/or electronics package 205 by measuring and/or analyzing the spin-up current draw of spindle motor 200, noise, temperature, short-duration anomalies, etc.

Difference vectors are generated, compared and analyzed at block 903 by prediction module 103 (e.g., by comparing different current draw profiles and/or difference vectors to previously determined current draw profiles and/or difference vectors). If one or more of the analyzed prediction data 107 exceeds a predetermined threshold or is otherwise determined by prediction module 103 to be indicative of an impending failure of HDD 110 at decision block 904, prediction module 103 initiates responsive measures at block 905. Responsive measures may comprise presenting a warning notice on I/O device 106 and/or backing up data on HDD 110 to avoid loss of the data. Back-up data may be stored in memory 102 or another DMD coupled to computer 100. If at decision bock 904 it is determined that prediction data 107 is not indicative of an impending HDD 110 failure, the method proceeds to block 902, where prediction module 103 continues monitoring HDD 110 performance.

It should be understood that in the described method, certain functions may be omitted, accomplished in a sequence different from that depicted in FIG. 9, or simultaneously performed. Also, it should be understood that the method depicted in FIG. 9 may be altered to encompass any of the other features or aspects as described elsewhere in the specification. Further, embodiments may be implemented in software and can be adapted to run on different platforms and operating systems. In particular, functions implemented by prediction module 103, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semiconductor system, apparatus, device, or propagation medium.

What is claimed is:

1. A method for predicting failure of a digital media drive, comprising:

measuring a current draw associated with a digital media drive at least two different operating times of the digital media drive; and automatically determining whether a difference between the measured current draws indicates an impending failure of the digital media drive; and generating a current draw profile for the digital media drive for determining the difference.

2. The method of claim 1 further comprising determining that the difference is indicative of an impending failure of the digital media drive in response to the difference exceeding a predetermined threshold.

3. The method of claim 1 wherein measuring the current draw comprises measuring the current draw associated with a spindle motor of the digital media drive.

4. The method of claim 1 further comprising evaluating a rate of change in a current draw associated with the digital media drive to predict an impending failure of the digital media drive.

5. The method of claim 1 further comprising determining a presence of short-duration anomaly in the difference.

6. The method of claim 5 wherein determining the presence of the short-duration anomaly comprises determining a frequency spectrum of the difference.

7. The method of claim 1 further comprising evaluating a temperature associated with the digital media drive to predict an impending failure of the digital media drive.

8. The method of claim 1 further comprising modifying a prediction module, the prediction module comprising data relating one or more measurements of a current draw with one or more failures of a digital media drive.

9. A digital media drive failure prediction system, comprising:

a prediction module configured to analyze a current draw associated with a digital media drive measured at least two different operating times of the digital media drive to automatically determine whether a difference between the measured current draws indicates an impending failure of the digital media drive, wherein the prediction module is configured to determine a presence of a short-duration anomaly in the difference and wherein the prediction module is configured to output a signal providing notice of the impending failure or to backup data of the digital media drive upon indication of the impending failure.

10. The system of claim 9 further comprising a current meter configured to measure the current draw associated with the digital media drive.

11. The system of claim 9 wherein the prediction module is configured to analyze a current draw associated with a spindle motor of the digital media drive.

12. The system of claim 9 wherein the prediction module is configured to analyze a temperature associated with the digital media drive to predict an impending failure of the digital media drive.

13. The system of claim 9 wherein the prediction module is configured to identify an impending failure of the digital media drive if the difference exceeds a predetermined threshold.

14. The system of claim 9 wherein the prediction module is configured to determine a frequency spectrum associated with the difference.

15. The system of claim 9 wherein the prediction module is configured for machine-learning.

16. A computer program embodied on a computer readable medium, and when executed by a processor, operable to:

analyze a difference between a current draw associated with a digital media drive measured at least two different operating times of the digital media drive;

to determine a presence of a shod-duration anomaly in the difference to predict an impending failure of the digital media drive; and predict an impending failure of the digital media drive using the at least one difference; and upon indication of the impending failure, output a signal providing notice of the impending failure on an output device or backup data of the digital media drive.

17. The computer program of claim 16 wherein the computer program, when executed by the processor, is configured to determine a frequency spectrum of the difference.

18. A method for predicting failure of a digital media drive, comprising:

measuring a current draw associated with a digital media drive at least two different operating times of the digital media drive; and automatically determining whether a difference between the measured current draws indicates an impending failure of the digital media drive; and determining a presence of short-duration anomaly in the difference.

19. The method of claim 18 wherein determining the presence of the short-duration anomaly comprises determining a frequency spectrum of the difference.

\* \* \* \* \*

UNITED STATES PATENT AND TRADEMARK OFFICE
CERTIFICATE OF CORRECTION

PATENT NO. : 7,707,461 B2 Page 1 of 1
APPLICATION NO. : 11/700482
DATED : April 27, 2010
INVENTOR(S) : Michael J. Dougherty et al.

It is certified that error appears in the above-identified patent and that said Letters Patent is hereby corrected as shown below:

On the Title page, in Item (57), Abstract, in column 2, line 3, after "measured" insert -- at --.

In column 7, line 66, in Claim 1, after "drive" insert -- at --.

In column 8, line 32, in Claim 9, after "measured" insert -- at --.

In column 8, line 66, in Claim 16, after "measured" insert -- at --.

In column 9, line 1, in Claim 16, delete "shod-duration" and insert -- short-duration --, therefor.

In column 10, line 2, in Claim 18, after "drive" insert -- at --.

Signed and Sealed this

Third Day of August, 2010

David J. Kappos
*Director of the United States Patent and Trademark Office*